UNITED STATES PATENT OFFICE 2,021,318

PROCESS FOR PRODUCING CHLORINATED RUBBER AND PRODUCT THEREOF

John McGavack, Leonia, N. J., assignor, by mesne assignments, to United States Rubber Company, New York, N. Y., a corporation of New Jersey No Drawing. Application March 2, 1934, Serial No. 713,780

3 Claims. (Cl. 260—1)

This invention relates to the production of chlorinated rubber and more particularly to a chlorinated rubber powder derived directly from latex.

The introduction of chlorine into a normal rubber latex or into concentrated latex, such as one prepared by a chemical or mechanical creaming process, effects a substantially immediate coagulation of the rubber in the form of a coherent mass. The chlorination of such a mass of rubber may be continued by chlorinating in a closed container under pressure in a manner similar to the chlorination of raw dried rubber to produce a more or less coalesced mass of chlorinated rubber having the desired chlorine content.

Another method utilizing latex for the production of chlorinated rubber is by adding a large amount of an organic solvent to the latex so that the rubber particles from the latex will become dispersed in the solvent similar to the dispersion of previously coagulated rubber in a rubber solvent cement and this latex and solvent together with various compounding ingredients, such as phenol and aldehydes, may be chlorinated until the solid mass separates from the liquid medium, after which the solvent may be recovered and the mass washed and dried.

A further method of utilizing latex for the production of chlorinated rubber has been suggested wherein a granular material, such as Kieselguhr, is added to the latex so that dispersed rubber particles will precipitate on the Kieselguhr and provide a large surface of rubber for chlorination either before or after drying the mass of rubber coated granular particles.

In these prior methods there is a direct coagulation of the rubber particles dispersed in the latex and the product of these processes results either in a coherent mass of chlorinated rubber or in a granular product, the major proportion of which is not a chlorinated rubber material but an inert granular material the surface only of which is coated with chlorinated rubber. Where large amounts of solvent are added to the latex prior to chlorination, extensive recovery of the solvent must be accomplished as in any production of chlorinated rubber from rubber cements.

The present invention relates to the production of chlorinated rubber in the form of a fine powder directly from rubber latex without the necessity for contaminating the product with large proportions of inert material and without the use of large proportions of rubber solvents which necessitate expensive recovery processes.

According to the present invention, the rubber latex, normal or concentrated, is stabilized against a premature coagulation of the rubber on chlorination of the latex, after which stabilization, chlorine is introduced into the latex until a precipitation of discrete particles of a chlorinated rubber takes place. Various methods of stabilizing the latex to produce this result may be resorted to, but it has been found that this stabilization is not sufficient to produce a substantially chlorinated rubber in a truly dispersed condition, as are the original rubber particles in the latex. As chlorination of the stabilized latex proceeds, the dispersed rubber particles presumably absorb the chlorine and remain dispersed at least until sufficient chlorination has taken place, so that when the coagulation of the chlorinated rubber takes place, a precipitation of discrete particles rather than a solid mass of coagulum, is effected. After precipitation of these discrete particles of chlorinated rubber, further chlorination may take place by continuing the introduction of chlorine into the liquid in which the particles have precipitated. However, it is found more convenient to separate the precipitated chlorinated rubber particles from any accompanying liquid by filtration, decantation or like operation, and continuing the chlorination of these particles in a closed chamber either before or after drying.

Various methods have been devised for stabilizing the latex in such a manner that on chlorination of the latex, coagulation will not take place until sufficient chlorination has been accomplished to result in the precipitation of discrete particles of substantially chlorinated rubber. The preferred method is to first vulcanize the latex which produces a much more stable dispersion than an unvulcanized latex, and then to introduce chlorine into the thus vulcanized latex.

Without desiring to limit the invention, the following example of the production of chlorinated rubber powder from a latex stabilized by vulcanization, is included. A normal latex having about 36% solids was vulcanized by adding thereto .5 part of zinc oxide, 1 part of casein, 5 parts of precipitated sulphur, .5 part of mercaptobenzothiazole (accelerator) and .25 part of sodium dibutyl dithiocarbamate (accelerator), based on 100 parts of dry rubber in the latex, and heating this mixture at 90° C. for one and a half hours. The addition of the casein or some other stabilizer to stabilize the latex during the vulcanization is desirable, but may be dispensed with. In any case, after a vulcanization has taken place, a latex of considerably greater stability than the unvulcanized rubber latex, is produced. Chlorine was then bubbled into this vulcanized latex at atmospheric pressure. Considerable heat developed, and the latex gradually thickened. Coarse flocculated particles soon appeared and as the reaction developed, these particles gradually separated. In the meantime, the heat of the reaction had driven off a good part of the water, and the remaining liquid was eliminated by filtering. The chlorination of the separated particles was continued until a white, powdery hard material was obtained. An analysis of this product showed 39.6% chlorine, 0.0 sulphur, and .31% ash. It is interesting to note that all of the sulphur from the vulcanization had been eliminated by the chlorine. The desired chlorine content of the chlorinated rubber may be accomplished by continuation of the chlorination, to the desired extent, of the precipitated particles in the liquid or of the particles separated from the liquid after coagulation. The chlorinated rubber powder may be used in the manufacture of paints and in coating and molding compositions.

In view of the many changes and modifications that may be made without departing from the principles underlying the invention, reference should be made to the appended claims for an understanding of the scope of the invention.

Having thus described my invention, what I claim and desire to protect by Letters Patent is:

1. A process for producing chlorinated rubber comprising vulcanizing latex and introducing chlorine into the vulcanized latex.

2. A process for producing chlorinated rubber comprising vulcanizing latex and introducing chlorine into the vulcanized latex at least until precipitation of discrete particles of chlorinated rubber takes place.

3. A process for producing chlorinated rubber comprising vulcanizing latex and introducing chlorine into the vulcanized latex until precipitation of discrete particles of chlorinated rubber takes place, separating any accompanying liquid from the chlorinated rubber particles, and continuing the chlorination of the separated particles by further treatment with chlorine.

JOHN McGAVACK.